(12) United States Patent
Jones

(10) Patent No.: US 7,417,919 B2
(45) Date of Patent: Aug. 26, 2008

(54) DETERMINATION OF SENSOR DISTANCE

(75) Inventor: Richard Warren Jones, Abingdon (GB)

(73) Assignee: Hymetrics Limited, Oxford (GB)

( * ) Notice: Subject to any disclaimer, the term of this patent is extended or adjusted under 35 U.S.C. 154(b) by 0 days.

(21) Appl. No.: 11/927,554

(22) Filed: Oct. 29, 2007

(65) Prior Publication Data

US 2008/0098817 A1 May 1, 2008

(30) Foreign Application Priority Data

Oct. 30, 2006 (GB) .................................. 0621532.1

(51) Int. Cl.
*G01H 5/00* (2006.01)

(52) U.S. Cl. ....................................... 367/13; 367/902

(58) Field of Classification Search .................. 367/902, 367/13, 909
See application file for complete search history.

(56) References Cited

U.S. PATENT DOCUMENTS

| 4,388,708 | A | * | 6/1983 | Skrgatic et al. | ............. | 367/902 |
| 4,769,793 | A | * | 9/1988 | Kniest et al. | ................ | 367/902 |
| 4,964,104 | A | * | 10/1990 | Capurka | ...................... | 367/902 |
| 6,631,097 | B2 | * | 10/2003 | Su | .............................. | 367/902 |
| 2007/0008820 | A1 | * | 1/2007 | Yang | ............................ | 367/99 |
| 2008/0098817 | A1 | * | 5/2008 | Jones | .......................... | 73/597 |

* cited by examiner

*Primary Examiner*—Dan Pihulic
(74) *Attorney, Agent, or Firm*—William H. Holt

(57) ABSTRACT

Apparatus is described for accurately determining the elevation, E, of a pulse-echo ultrasonic range sensor (2) relative to a datum level (14). The figure shows vertical elevations of the apparatus with plate deployed at level-1 (12) and level-2 (13) above a datum level (14), the levels being separated by a known distance, D. The elevation of the sensor is given by the relationship:

$$R1 = D|(dt1/(dt2-dt1))|$$

where dt1 and dt2 are the intervals of time, determined by the sensor, taken by a pulse-echo to transit the distances R1 and R2 respectively. This apparatus may also be used to determine sonic velocity, Sv from:

$$Sv = |2D/(dt2-dt1)|.$$

10 Claims, 5 Drawing Sheets

DETERMINATION OF SENSOR DISTANCE

The invention relates to the measurement of the flow of water passing along a channel. Flow measurement is often required for the monitoring of discharge into rivers and streams in accordance with permits issued by regulating authorities.

The measurement of flow in open channels requires a measurement of the water level in the channel. If the flow passes over a weir or through a flume, collectively known as hydrometric structures, then the water surface level measurement is used to determine the upstream head of water approaching the hydrometric structure. The head measurement is measured relative to a hydraulic datum level at a weir crest or at the base of a flume. When the water surface is at the hydraulic datum level, the head of water and the flow rate are zero. From the value of upstream head, the flow rate can be computed using formulae specified ISO hydrometric Standards.

Air range ultrasonic sensors are commonly used to determine the level of a water surface. The sensor is fixed above the water to direct sonic pulses downwards onto the water. With knowledge of the velocity of the pulse, Sv, and by measuring the interval of time, dt, between emitting a pulse and detecting its echo, the sensor can determine the range, R, from the sensor to the water surface. The relationship is: R=0.5 Sv dt. If the elevation, E, of the sensor relative to the hydraulic datum is known, then subtracting the measured range, R, from that elevation, gives the head, h, of the water: h=E−R.

A problem frequently encountered when measuring upstream head is how to determine the elevation, E, with sufficient accuracy to ensure accurate head measurement relative to the hydraulic datum level. To determine E precisely, a reflecting surface, known as a reference plate, is positioned in the sonic path at a known elevation E1 relative to the datum-level. The distance to the reference plate, R1, is then measured by the sensor. From this, the sensor elevation E is determined: E=E1+R1. Subsequent movement of the water level h then can be determined by subsequent measurements of distance, R.

But the use of ultrasound to measure distance depends on a precise knowledge of the speed of the pulse, Sv. If the distance R calculated from R=0.5 Sv dt is imprecise because Sv is uncertain, then the elevation of the sensor E becomes uncertain. Sv is usually deduced from a measurement of air temperature.

The invention enables the elevation E of a sensor above a datum level to be precisely determined and the sonic velocity Sv measured without resort to a derivation of sonic velocity from a temperature measurement. By the system described, the measurement accuracy of air-range measuring ultrasonic systems is significantly improved.

DESCRIPTION OF THE INVENTION

The above and other objects of the invention are achieved by apparatus to enable the determination of a distance, R1, of a range-sensor from a reference plane, the range-sensor transmitting pulses and detecting echoes along a pulse-echo path, the reference plane being normal to the pulse-echo path. The apparatus comprises: a reference plate with a pulse-reflective surface; positioning means to locate the reference plate in the reference plane at a first position on the pulse-echo path, there to reflect pulses back to the range sensor; and positioning means to locate the reference plate at a second position on the pulse-echo path at a known distance D from the first position, there to reflect pulses back to the range-sensor.

The range-sensor incorporates: timing means to determine a time interval, dt1, between sending a pulse and receiving its echo from the reference plate at the first position; timing means to determine a time interval, dt2, between sending a pulse and receiving its echo from the reference plate at the second position.

The range-sensor also incorporates computing means to calculate the distance, R1, of the sensor from the reference plane from $$R1 = D|(dt1/(dt2-dt1))|$$

Preferably the reference plate is supported on a support bar extending parallel to the pulse-echo path, the bar extending through at least one bracket element. The bar may extend through a pair of bracket elements spaced apart by the known distance D.

Preferably the support bar incorporates locating means whereby the support bar may be located at two predetermined positions relative to the bracket element. For example if there are a pair of bracket elements as mentioned above, the support bar may incorporate a projecting lug or pin which locates in a notch in one or other of the bracket elements. Alternatively the support bar may incorporate a pair of projecting lugs which may locate in a notch in a bracket element, the lugs being spaced apart by the known distance D.

BRIEF DESCRIPTION OF THE DRAWINGS

A specific embodiment of the invention will now be described by way of example only, and with reference to the accompanying drawings.

AN EMBODIMENT OF THE INVENTION

Figure 1:
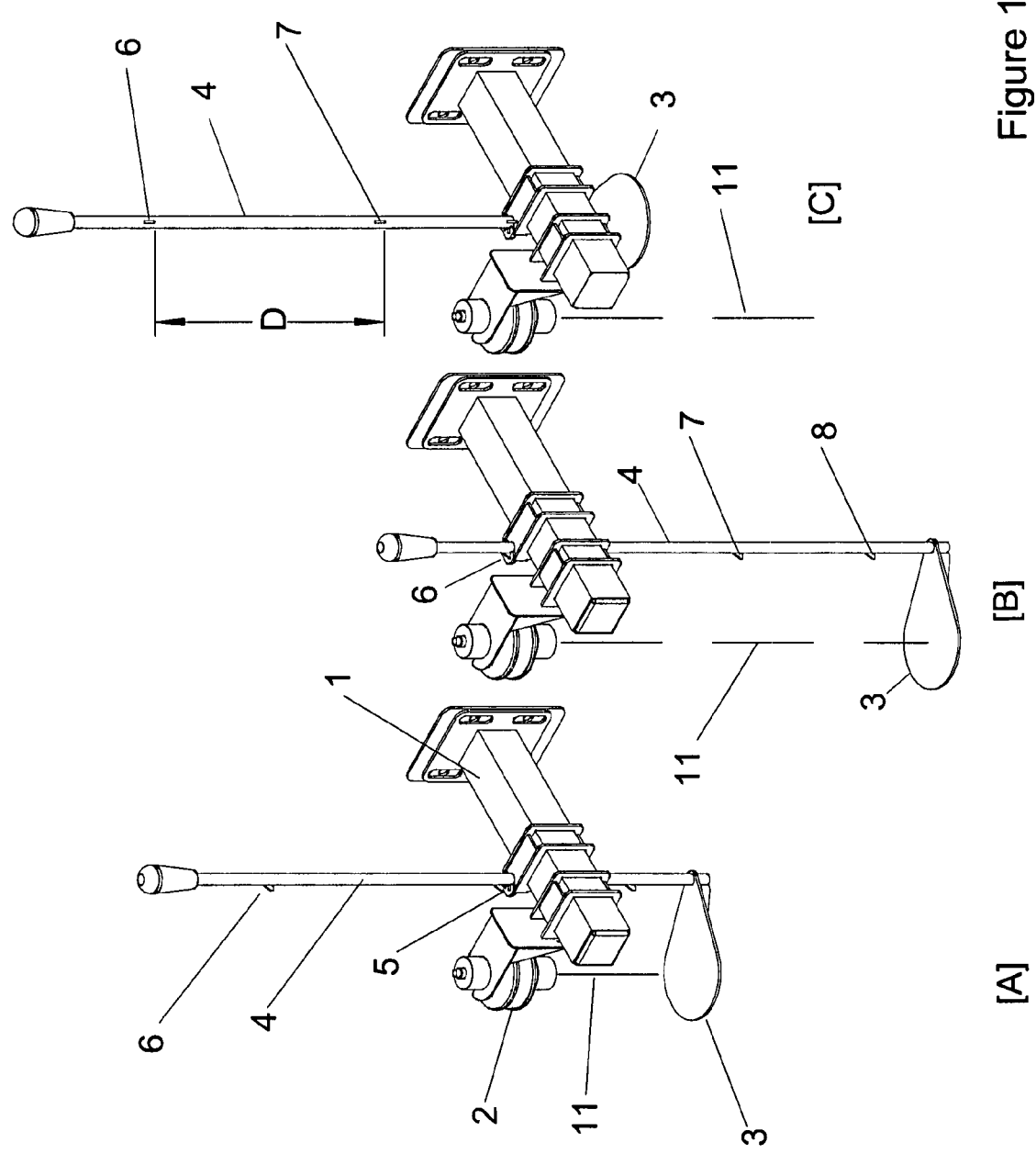
FIG. 1 shows perspective views of the apparatus of the invention, the apparatus being shown in three states: [A] a level-1 position, [B] a level-2 position and [C] a parked position.

Referring to FIG. 1, an apparatus of the invention includes a mounting bracket 1, arranged to support an ultrasonic sensor 2 which has a pulse-echo path 11. A reference plate 3 is mounted at the bottom end of a vertical rod 4, the rod 4 being free to slide vertically through a guide 5 in a frame clamped to the mounting bracket 1. The rod 4 may swivel about its axis in the guide 5. At three positions along the length of the rod are three location-lugs 6, 7 and 8. The distance between the bottom edges of lugs 6 and 7 defines a distance, D, that is used in calculations. The distance, D, must be precisely known.

Figure 2:
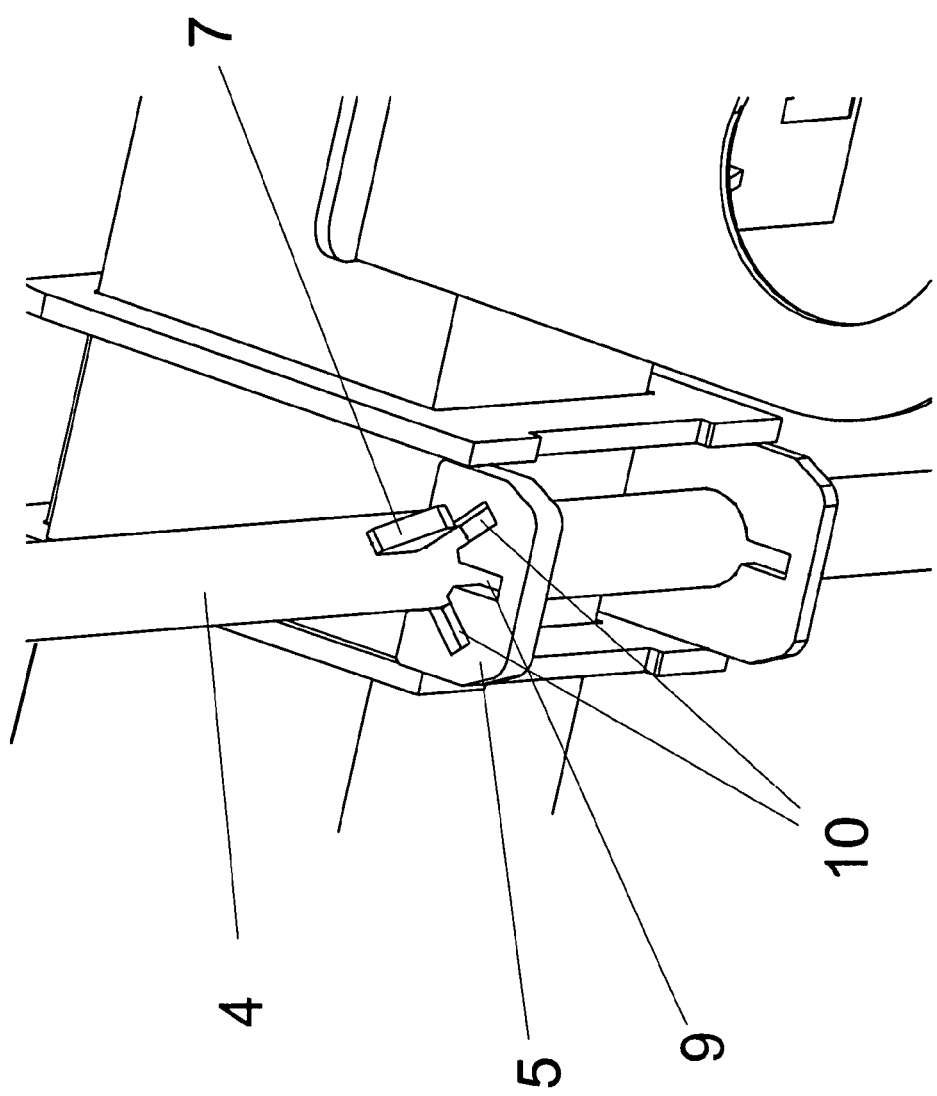
FIG. 2 is an enlargement of part of the apparatus of FIG. 1.

Referring now to FIG. 2, the guide 5 has a slot 9 through which the lugs 6, 7, and 8 on the rod 4 may pass. Radially disposed on each side of the slot 9 are two recesses 10 into which any one of the lugs may be located. In this way, the reference plate 3 may be located at any one of three vertical positions and be swivelled into the pulse-echo path 11, as in states [A] and [B] of FIG. 1, or away from the path, in state [C], which may be referred to as the parked position.

To locate the reference plate 3 in its parked position, the rod 4 is lifted, swivelled to allow the lugs 6, 7 and 8 to pass through the guide 5, and when the lug 8 has passed through the guide 5 it is then swivelled to locate the reference plate 3 away from the sonic path 11 before lowering the lug 8 into a recess 10 in the upper surface of the guide 5.

To locate the reference plate 3 in its upper or lower reference positions (i.e. states [A] and [B]), the rod 4 is lifted, swivelled to allow the lugs to pass through the guide 5 and lowered until the lug 6 or the lug 7 is above the guide 5 and then swivelled to locate the reference plate 3 in the sonic path 11 before lowering the lug 6 or 7 into the other recess 10.

In this way, the reference plate 3 can be set in one of three positions, indicated by states [A], [B] and [C]. The parked position [C] is set when the sensor 2 is measuring the water level. The two reference positions set by states [A] and [B] are used to determine the elevation of the sensor 2 or to determine the sonic velocity.

Referring now to FIGS. 3A and B, these show the apparatus with the reference plate 3 deployed at level-1 12 (i.e. state [A]) and level-2 13 (i.e. state [B]) above a datum level 14 respectively.

Figure 3:
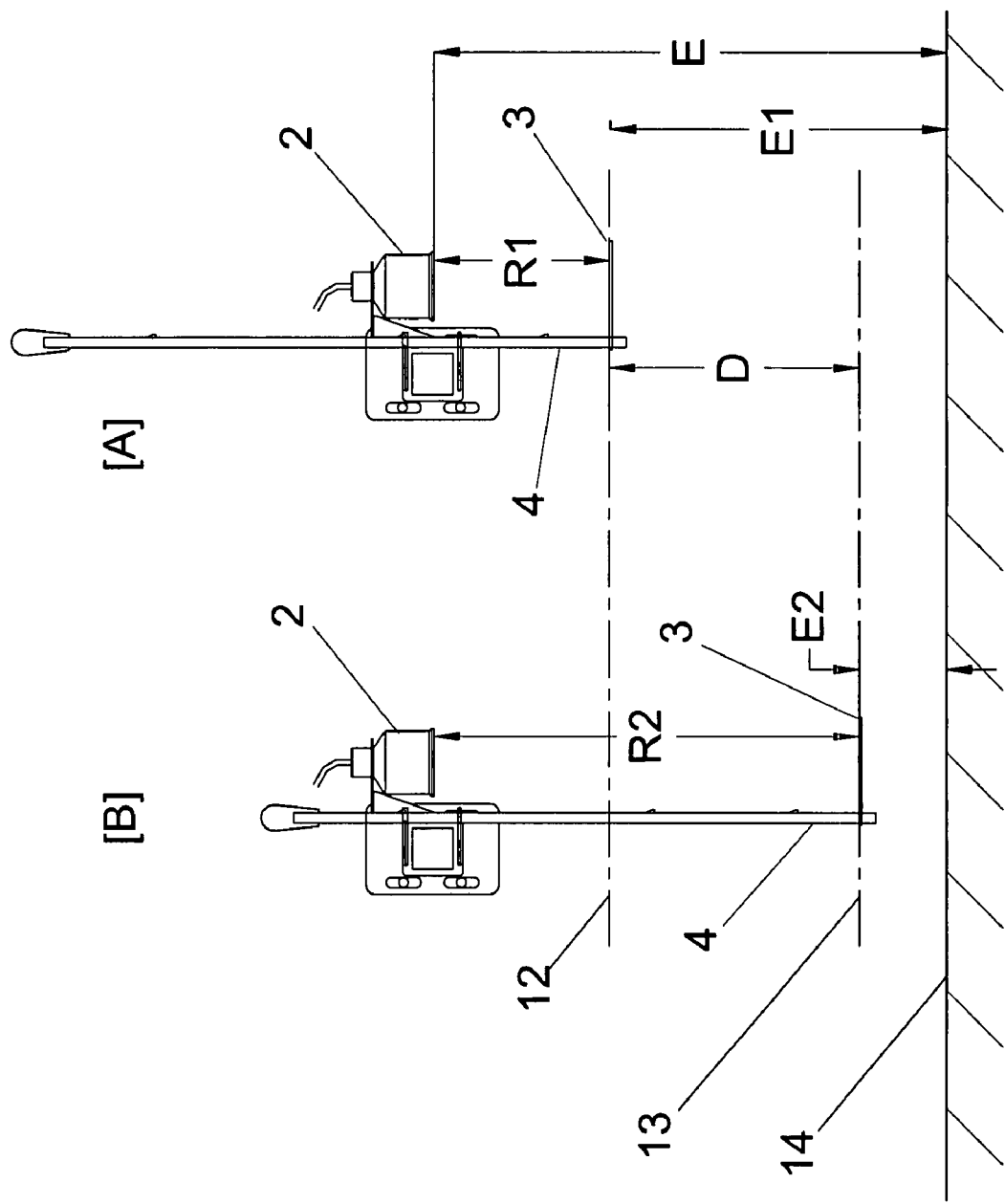
FIG. 3 shows side elevations of the apparatus of FIG. 1 with the reference plate at two different positions: [A] a level-1 position, and [B] a level-2 position (corresponding to the states shown in FIGS. 1A and 1B)

In a modification to the apparatus of FIGS. 1 to 3, the reflector plate 3 and the vertical rod 4 are demountable from the guide 5. In this arrangement of the apparatus, instead of the guide 5 having a circular hole through which the rod 4 may be raised, lowered and swivelled, the guide has a slot open at one end, to allow the rod 4 to be detached from the guide 5.

Figure 4:
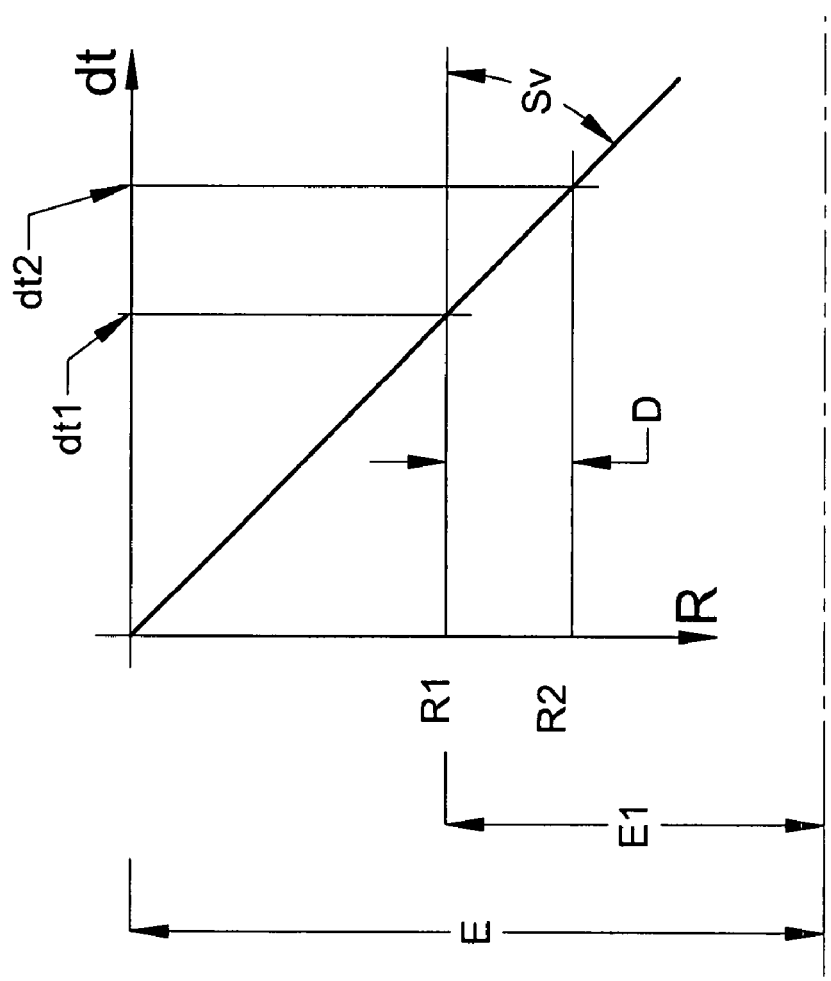
FIG. 4 shows a graph of the relationship between time and distance parameters in operation of the present invention.

The graph of FIG. 4 shows range R versus pulse-echo time interval dt, range being drawn in the negative direction (because the sensor 2 is directed downward). The graph shows the relationship between the elevations E and E1 and D of FIG. 3, the sonic velocity, Sv and transit times dt1 and dt2. From these relationships, $$Sv = 2D/|(dt2-dt1)|$$

and $$E = E1 + 0.5 Sv\, dt1$$

The value of Sv should not vary during the short interval between changing between the two states [A] and [B] (the measurements with the reference plate 3 at the positions level-1 12 and level-2 13). So the two sets of measurements should be made with minimum delay between them. During this process, each range value R1 and R2 may be measured repeatedly to derive average values and so increase the accuracy.

It has been pointed out above that the value of Sv is conventionally determined from a measurement of air temperature, and that this determination is uncertain. If an air-temperature determination of sonic velocity is Sv', then the proportional error in that value would be $$\mathrm{Error}(Sv) = (Sv - Sv')/Sv$$

If the value Sv' was then to be used to determine the elevation E then, according to FIG. 4, error would exist in that determination according to $$\mathrm{Error}(E) = R1\,\mathrm{Error}(Sv)$$

where R1 is the distance to the reflector at the precisely known elevation E1.

Figure 5:
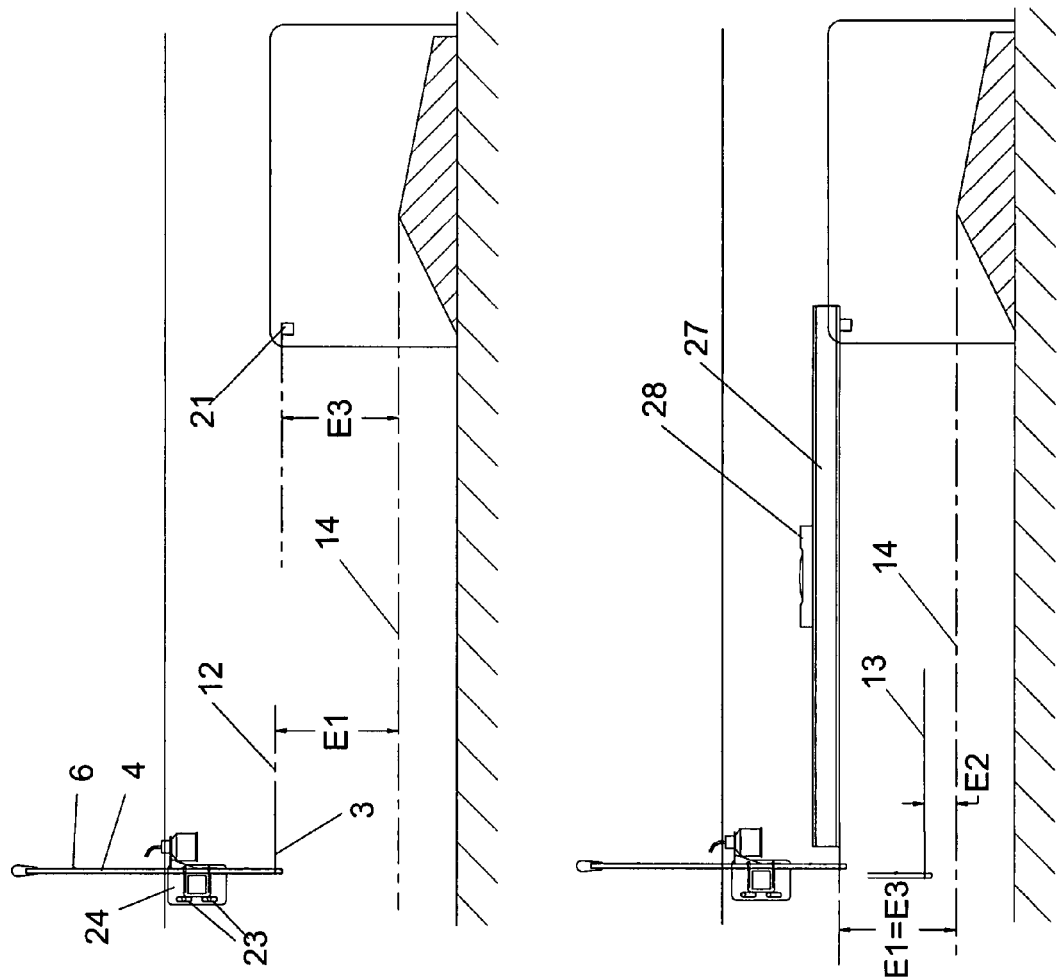
FIG. 5 shows a diagrammatic side view of the apparatus of the invention installed with reference to a hydrometric structure, shown at two stages during operation.

Referring now to FIG. 5, this shows a reference bar 21 fixed to a hydrometric structure with its upper surface at an elevation E3 above the hydraulic datum 14. Slots 23 in a flange 24 on the mounting bracket 1 enable the mounting bracket 1 to be positioned so that level-1 12 of the reference plate 3, as shown in the upper drawing, lies in the same horizontal plane as the top of the reference bar 21. The elevations E1 and E3 are then equal. As shown in the lower drawing, the adjustment of the position is by laying a beam 27 with a spirit level 28 (plus or minus 0.2° resolution) between the upper surface of the reference bar 21 and the top of the reference plate 3, and adjusting the height of the mounting bracket 1 until the beam 27 is horizontal. For convenience, the reference bar 21 may be engraved with the value of its top-face elevation E3. The position of the top lug 6 on the rod 4 is such that the second elevation E2 is above but close to the hydraulic datum 14.

Typically the ultrasonic sensor 2 for this purpose would produce ultrasound at a frequency between 50 kHz and 150 kHz, as this ensures that the ultrasound is accurately directional. The lower the frequency the longer the range, while the higher the frequency the more accurate the timing and hence the more accurate the measurement. For measuring water heights and a frequency between 90 kHz and 110 kHz is usually suitable. Although the apparatus described above was described as being used in conjunction with an a source of ultrasound, it should be appreciated that an apparatus substantially equivalent could be used with different types of range sensor, for example a laser or a microwave distance sensor.

I claim:

1. An apparatus to enable a determination of a distance, R1, of a range sensor from a reference plane, the range sensor transmitting pulses and detecting echoes along a pulse-echo path, the reference plane being normal to the pulse-echo path, the apparatus comprising:
   i) a reference plate with pulse-reflective surface;
   ii) positioning means to locate the reference plate in the reference plane at a first position on the pulse-echo path, there to reflect pulses back to the range sensor;
   iii) positioning means to locate the reference plate at a second position on the pulse-echo path at a known distance D from the first position, there to reflect pulses back to the range sensor;
   and the range sensor incorporating:
   iv) timing means to determine a time interval, dt1, between sending a pulse and receiving its echo from the reference plate at the first position;
   v) timing means to determine a time interval, dt2, between sending a pulse and receiving its echo from the reference plate at the second position; and
   vi) computing means to calculate the distance, R1, of the sensor from the reference plane from, $$R1 = D|(dt1/(dt2-dt1))|.$$

2. An apparatus according to claim 1 with range sensor having computing means to calculate a velocity, Sv, of propagation of the pulse-echo from:

$$Sv = |2D/(dt2-dt1)|.$$

3. An apparatus according to claim 1 in which the reference plane is horizontal at a known distance E1 above a datum plane, the apparatus enabling the determination of the elevation, E, of the range sensor relative to the datum plane, the range sensor having computing means to calculate the elevation, E, from:

$$E = E1 + R1.$$

4. An apparatus as claimed in claim 1 wherein the reference plate is supported on a support bar extending parallel to the pulse-echo path, the bar extending through at least one bracket element.

5. An apparatus as claimed in claim 4 wherein the bar extends through a pair of bracket elements spaced apart by the known distance D.

6. An apparatus as claimed in claim 4 wherein the support bar incorporates locating means whereby the support bar may be located at two predetermined positions relative to the bracket element.

7. An apparatus as claimed in claim 5 wherein the support bar incorporates a projecting lug which locates in a notch in one or other of the bracket elements.

8. An apparatus as claimed in claim 4 wherein the support bar incorporates a pair of projecting lugs which may locate in a notch in a bracket element, the lugs being spaced apart by the known distance D.

9. An apparatus according to claim 3, in which the datum plane is the hydraulic datum of a channel, the channel including a hydrometric structure with a reference bar defining a second reference plane at an elevation E3 above the hydraulic datum, the apparatus enabling the sensor to be fixed at a known elevation, E, above the hydraulic datum by means for adjusting and fixing the vertical position of the apparatus such that the first position of the reference plate lies in the second reference plane with E1=E3, from which:

$$E=E3+R1.$$

10. An apparatus according claim 9 also including a beam, and means of indicating the inclination of the beam from the horizontal, wherein the beam may be located to span between the reference plate of the apparatus at the first position and the reference bar of the hydrometric structure so that the vertical position of the apparatus may be adjusted and so fixed with the beam lying in the horizontal plane.

* * * * *